Patented Dec. 30, 1952

2,623,881

UNITED STATES PATENT OFFICE 2,623,881

PRODUCTION OF SULFONIC ACIDS

Holger G. H. Erdtman, Stockholm, Sweden

No Drawing. Application July 26, 1949, Serial No. 106,979. In Sweden July 29, 1948

9 Claims. (Cl. 260—319)

The present invention relates to the production of sulphonic acids of the general formula $$R.CH_2.SO_3H$$

in which R represents an aromatic radical which may be heterocyclic or isocyclic. Such sulphonic acids show different kinds of biologic activity.

Hitherto the said sulphonic acids have mainly been prepared by reacting the halogenid of the radical which is to be bound to the sulphonic group with a sulphite. However, the organic halogenids used as starting material are often difficult to produce or unstable, which has hitherto been an obstacle against their preparation.

It is the main object of the present invention to find a new way of producing the said sulphonic acids by which the previous difficulties are voided.

This object and other advantages which will be evident from the following description are gained according to the invention by using as a starting material a special kind of nitrogen compound of the organic radical of the sulphonic acid to be produced and reacting such nitrogen compound with a sulphite, preferably in the presence of a diluent such as water.

The particular aromatic nitrogen compounds to be used are aromatic aminomethyl derivates as they contain or derive from the group R.CH$_2$.N< in which R is an aromatic isocyclic or heterocyclic radical and the nitrogen atom has basic nature.

The aminomethyl compounds to be used have the general formula

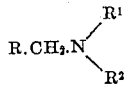

in which R is the same radical as above stated and R$^1$ and R$^2$ are hydrogen or alkyl groups. The substituents R$^1$ and R$^2$ may also be parts of a ring such as the piperidine or morpholine rings.

The good results according to the invention are, however, also obtained if the group R.CH$_2$.N< is a part of a quaternary ammonium compound of the general formula.

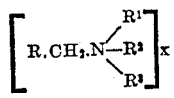

in which R is the same group as before X a negative radical and R$^1$, R$^2$ and R$^3$ are members of the group consisting of hydrogen and alkyl groups and in which two of the substituents R$^1$, R$^2$ and R$^3$ may be interconnected in a ring such as in piperidine or morpholine.

All these nitrogen compounds referred to above may easily be produced by the so called Mannich reaction (see "Organic Reactions" by Roger Adams, W. E. Bachmann, L. F. Fieser, J. R. Johnson and H. R. Snyder, vol. 1, New York 1942, p. 303 and following) which consists in condensing ammonia or a primary or secondary amine, usually as the hydrochloride, with formaldehyde and an organic compound containing at least one hydrogen atom of pronounced reactivity.

All these above mentioned organic aminomethyl derivates whether in the form of amino compounds or in the form of the corresponding quaternary ammonium compounds have been found to have the common property that they easily react with a sulphite whereby the bond between nitrogen and the methylene group bound to the aromatic radical R is broken and the nitrogen containing radical is substituted by a sulphonic group.

The sulphites used according to the invention may be either neutral or acid, the neutral sulphites being preferred as they give better yields.

The following examples are given for the purpose of illustrating the invention only and not for limiting the same.

Example I 20 g. of gramine [β-(N-dimethyl aminomethyl)-indol] were heated with 20 g. neutral sodium sulphite and 350 g. water to 110° C. and held at this temperature for 10 hours. On cooling the difficulty soluble sodium salt of β-indolyl-methane-sulphonic acid crystallizes. The compound was recrystallized in water. The yield was quantitative. The β-naphthylamine salt of the sulphonic acid melts at 228° C.

Example II

A mixture of 25 g. of 2-N-dimethyl-aminomethyl-4-methylphenol, 50 g. of sodium sulphite and 550 g. of water was heated for 10 hours at 110° C. The reaction mixture was then concentrated and the concentrated solution extracted with ether. The water phase was then passed through a hydrogen saturated cation exchanger after which barium carbonate in excess was added to the filtrate. The solids of the reaction mixture were then removed by filtration and the filtrate concentrated. From the concentrated solution the barium salt of 2-hydro-5-methylbenzyl-sulphonic acid crystallized. The crystallization may be accelerated or made more complete by the addition of an organic solvent intermiscible with water such as ethanol.

I have also carried out the reactions described in the above examples with other compounds such as β-(N-diethyl-amino-methyl)-indol

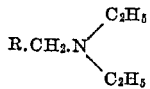

where R is the indol radical, β-(piperidino-methyl)-indol

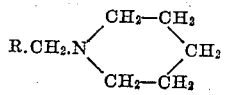

where R is the indol radical as well as 2:5-bis-(dimethyl-aminomethyl)-hydroquinone.

I claim:

1. The method of producing sulphonic acids of the general formula $R.CH_2.SO_3H$ in which R is an aromatic radical, consisting in reacting, in the presence of a solvent, an inorganic sulphite with a compound of the general formula

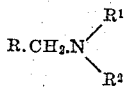

in which R is an aromatic radical and $R^1$ and $R^2$ are members of the group consisting of hydrogen alkyl groups and methylene groups of a heterocyclic ring containing not more than five methylene groups and in which the nitrogen atom is of basic nature.

2. The method as defined in claim 1 in which $R^1$ and $R^2$ are alkyl groups.

3. The method as defined in claim 1 in which the compound

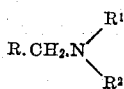

is supplied to the reaction in the form of a quaternary ammonium compound.

4. The method as defined in claim 1 in which the compound

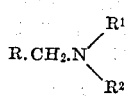

is supplied to the reaction in the form of a quaternary ammonium compound and in which $R^1$ and $R^2$ are methylene members of a heterocyclic ring.

5. The method as defined in claim 1 in which R is an isocyclic radical.

6. The method as defined in claim 1 in which the group

is an integral part of a morpholino group.

7. The method as defined in claim 1 in which the group

is an integral part of a piperidino group.

8. The method of producing β-indolyl-methan-sulphonic acid in the form of its sodium salt in which gramine is heated with sodium sulphite in the presence of water after which the sodium salt of the sulphonic acid is crystallized out of the solution by cooling.

9. The method of producing 2-hydroxy-5-methyl-benzyl-sulphonic acid in the form of its barium salt, which consists in heating a mixture of 2-N-dimethyl-aminomethyl-4-methyl-phenol, sodium sulphite and water till the reaction is completed, concentrating the reaction mixture and extracting said concentrate with ether, the remaining water phase then being passed through a hydrogen saturated cation exchanger, the resulting filtrate being treated with barium carbonate, filtered, concentrated, and cooled whereby the barium salt of the 2-hydroxy-5-methyl-benzyl sulphonic acid is crystallized out of the solution.

HOLGER G. H. ERDTMAN.

REFERENCES CITED

The following references are of record in the file of this patent:

UNITED STATES PATENTS

| Number | Name | Date |
|---|---|---|
| 2,323,714 | Kirby et al. | July 6, 1943 |

FOREIGN PATENTS

| Number | Country | Date |
|---|---|---|
| 134,401 | Germany | Sept. 8, 1902 |

OTHER REFERENCES

Wieland et al., Annalen, 561 pp. 47-52 (1948).